United States Patent Office 3,689,435
Patented Sept. 5, 1972

3,689,435
DETERGENCY COMPOSITIONS CONTAINING A SYNERGISTIC MIXTURE OF PVP AND PVA
Rene P. Berni, Oradell, N.J., and Richard A. Grifo, Easton, Pa., assignors to GAF Corporation, New York, N.Y.
No Drawing. Filed July 27, 1970, Ser. No. 58,647
Int. Cl. C11d 3/065, 3/20, 3/28
U.S. Cl. 252—524                                  7 Claims

ABSTRACT OF THE DISCLOSURE

A soil, anti-redeposition agent for use in laundry applications is disclosed, which agent comprises a synergistic mixture of polyvinylpyrrolidone and polyvinyl alcohol.

BACKGROUND OF THE INVENTION

Field of the invention

This invention relates to soil anti-redeposition agents in laundry procedures and in particular to use of a mixture of polyvinylpyrrolidone and polyvinyl alcohol therefor.

Description of the prior art

It is well known in the art that a successful washing operation involves two separate factors, i.e., (a) the removal of dirt from the textile material and (b) keeping the soil suspended in the medium so that it will not be redeposited on the textile. In general aqueous washing media containing soap fulfill both of these criteria as soap not only is a good soil remover but also keeps the removed soil in suspension so that little re-deposition takes place. However, the present trend is toward the use of anionic synthetic detergents such as the alkyl benzene sulphonates since these agents can be used in hard water areas as their detersive power is not decreased by the presence of calcium and magnesium ions. However, these anionic detergents have the disadvantage that their suspending power is poor. Whereas they are very effective from the standpoint of removing soil they are not so effective in preventing re-deposition and so cotton fabrics washed with such agents will be grayer than when using soap. In order to overcome this disadvantage, various soil suspending agents are commonly added to the anionic detergents.

One of the most commonly used agents is polyvinyl alcohol. Other agents which have been used are sodium carboxymethylcellulose and polyvinylpyrrolidone. Mixtures of sodium carboxymethyl cellulose and polyvinyl alcohol as well as sodium carboxymethyl cellulose and polyvinylpyrrolidone have also been employed. See for example U.S. Pat. Nos. 3,000,830, 3,254,028, 3,284,364 and 3,318,816.

The mechanisms by which the combination of soil-suspending agents function in the washing baths to inhibit the redeposition of soil upon the fabric have not been determined exactly in view of the apparent co-action of these ingredients. In general, soil-suspending agents may function in detergent baths to prevent redeposition of soil onto fabrics in substantially different ways, i.e. one agent may be primarily effective due to its activity at the surface of the fabric whereas another agent may be effective primarily in its activity at the surface of the suspended soil particles. In the case of sodium carboxymethylcellulose or the like, this material is believed to be primarily effective in preventing deposition of soil upon cellulosic fabrics by its adsorption on the surface of the fabric. In contrast thereto, the polyvinylpyrrolidone is believed to be adsorbed to an appreciable extent on carbon soil, but is not adsorbed substantially on cotton from a detergent solution. Thus, the polyvinylpyrrolidone is much more effective in preventing the flocculation and precipitation of carbon in aqueous suspension than sodium carboxymethylcellulose.

The present invention provides a novel soil anti-redeposition synergistic mixture which provides excellent results in washing or laundry procedures.

SUMMARY OF THE INVENTION

It is accordingly one object of the present invention to provide novel soil anti-redeposition compositions.

A further object of the invention is to provide procedures for use of these compositions in washing and laundry procedures.

A still further object is to provide a synergistic mixture of polyvinylpyrrolidone and polyvinyl alcohol useful as a soil anti-redeposition composition.

Other objects and advantages of the present invention will become apparent as the description thereof proceeds.

In satisfaction of the foregoing objects and advantages, there is provided by the present invention an aqueous detergent composition containing a synergistic mixture of polyvinylpyrrolidone and polyvinyl alcohol in soil-suspending amounts. Also provided are procedures for use of these compositions in laundry applications in providing increased whitening effects.

DESCRIPTION OF PREFERRED EMBODIMENTS

In accordance with the present invention, it has been discovered that a mixture of polyvinylpyrrolidone and polyvinyl alcohol as a soil anti-redeposition composition possesses greater properties for this purpose than either component exhibits alone. Accordingly, it was found that the mixture exhibits a synergistic effect when present in soil suspending amounts. Thus it has now been found that this synergistic mixture has exceedingly useful soil-suspending properties when added to aqueous washing media.

The synergistic mixture may comprise from about 10 to 90 percent by weight of the polyvinylpyrrolidone to about 90 to 10 percent by weight of the polyvinyl alcohol. A preferred mixture, however, consists of about 50 weight percent of each component.

The polyvinylpyrrolidone component employed in the invention may be generally those polymers known in the art. As is well known in the art, polyvinylpyrrolidone is not a single, individual compound but may be obtained in almost any degree of polymerization. The degree of polymerization is most easily expressed in terms of average molecular weight. Although this invention comprises in its broad aspect the use of polyvinylpyrrolidone having any degree of polymerization and which is soluble in water at least to the extent of about .001% to about 0.1%, it is to be understood that not all the polymers possess the same degree of effectiveness. Thus, polyvinylpyrrolidones having an average molecular weight from about 5,000 to 100,000 and preferably 15,000 to about 40,000 exhibit maximum soil-suspending activity. For this reason it is preferred to use a polyvinylpyrrolidone of such molecular weight range in the washing operations.

The polyvinyl alcohol employed is also well known in the art and may be prepared from polyvinyl acetate or similar polyvinyl esters by replacement of acetate groups by hydroxyl groups and this chemical reaction is commonly known as hydrolysis in the art. The polyvinyl alcohol is often identified by its viscosity, and percent hydrolysis or percent ester content. The polyvinyl alcohol may be of low, medium or high viscosity and may be selected from the range of about 1.8 to 65, and preferably up to 6 centipoises. Reference to centipoises herein refers to determinations made in a 4% aqueous solution at 20° C. The product may contain minor amounts of polyvinyl acetate such as up to about 30% by weight and preferably from about 10 to 30% ester content. The degree of hydrolysis is thus usually within the range from about 70 to 100%. Suitable examples are polyvinyl alcohol which has a viscosity of 4 to 6 cps. with about 12% ester (88–89% hydrolysis); and polyvinyl alcohols having a viscosity of 21–25 cps. or 35–45 cps. with about 12% ester.

It is preferred to employ polyvinyl alcohol having a viscosity of 1.8 to 3 centipoises and a polyvinyl acetate content of about 10 to 30% by weight. This material exhibits maximum stability upon storage of the composition at elevated temperature resulting in maximum soil-suspending power for the composition. It may be prepared by any suitable manner such as by control of the degree of polymerization and alcoholysis of the polyvinyl acetate to produce a product of the above characteristics. The above viscosity range corresponds to an approximate weight average degree of polymerization of about 35 to 100. Examples thereof are polyvinyl alcohols having a viscosity of 2.34 cps. and 22.3% polyvinyl acetate; 1.88 cps. and 19.6% ester; 1.98 cps. and 29.4% ester; 2.38 cps. and 12.8% ester; and the like.

In applying this invention in practice the synergistic mixture may be dispersed into the aqueous washing medium in a concentration from about 0.001 to about 1.0%—the higher proportions giving the greater degree of protection against soil redeposition. It is obvious that the proportion of the mixture can be higher than the above range but in general increasing the concentration above 1.0% gives little if any added protection. If desired, the mixture can be incorporated with the detergent so as to form a composition which on dissolving in water furnishes the desired washing medium. To this end, the detergent is mixed with about 2 to 10% of the synergistic mixture.

In carrying out washing operations in accordance with this invention, the fabric or other textile material is agitated in the usual manner preferably at elevated temperatures as commonly used in laundries with the aqueous media containing the synergistic mixture and the detergent. As the detergent, one may use any of the materials commonly used for washing purposes.

The detergent may be, for example, of the anionic or nonionic types. In the first category are included ordinary soaps, that is, sodium or potassium salts of the higher fatty acids, or, usually, mixtures of higher fatty acids as are derived from naturally-occurring oils and fats. Also included in the anionic category are the detergents of the sulphonate or sulphate type. As well known in the art, a multitude of such materials are available, including the alkyl ($C_8$–$C_{18}$) sulphates, the alkyl ($C_8$–$C_{18}$) sulphonates, the alkyl ($C_8$–$C_{18}$) aromatic sulphonates, the mono- or di-alkyl ($C_8$–$C_{18}$) esters of sulphosuccinic acid, sulphonated or sulphated amides of the higher fatty acids such as N-sulphoethyl stearamide, and so forth. These compounds are generally employed in the form of their salts, i.e., their sodium, potassium, ammonium or amine salts. Some of the particular detergents which may be used are: sodium octyl sulphate, sodium nonyl sulphate, sodium decyl sulphate, sodium undecyl sulphate, sodium dodecyl sulphate, sodium tridecyl sulphate, sodium tetradecyl sulphate, sodium pentadecyl sulphate, sodium hexadecyl sulphate, sodium heptadecyl sulphate, sodium octadecyl sulphate, sodium oleyl sulphate, sodium octyl sulphonate, sodium nonyl sulphonate, sodium decyl sulphonate, sodium undecyl sulphonate, sodium dodecyl sulphonate, sodium tridecyl sulphonate, sodium tetradecyl sulphonate, sodium pentadecyl sulphonate, sodium hexadecyl sulphonate, sodium octadecyl sulphonate, sodium oleyl sulphonate, sodium salt of di-octyl sulpho-succinate, sodium octyl benzene sulphonate, sodium nonyl benzene sulphonate, sodium decyl benzene sulphonate, sodium undecyl benzene sulphonate, sodium dodecyl benzene sulphonate, sodium tridecyl benzene sulphonate, sodium tetradecyl benzene sulphonate, sodium pentadecyl benzene sulphonate, sodium hexadecyl benzene sulphonate, sodium heptadecyl benzene sulphonate, sodium octadecyl benzene sulphonate, sodium tri (isopropyl) benzene sulphonate, sodium tri (isobutyl) benzene sulphonate, sodium tri (isopropyl) naphthalene sulphonate, sodium tri (isobutyl) naphthalene sulphonate, and so forth. The commercially available detergents are generally not pure compounds but are mixtures of homologous compounds and are quite satisfactory. Thus for example, the sodium alkyl benzene sulphonate wherein the alkyl group contains 12 to 18 carbon atoms is a well known detergent. Others are: a mixture of sodium alkyl sulphates consisting mostly of sodium lauryl sulphate; a mixture of sodium alkyl phenol sulphonates wherein the alkyl group contains 12 to 18 carbon atoms; and a mixture of sodium alkyl sulphonates wherein the alkyl group contains 10 to 18 carbon atoms. As non-anionic detergents one may employ polyalkylene glycol esters, ethers and thioethers of the following types:

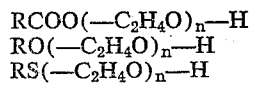

$$RCOO(-C_2H_4O)_n-H$$
$$RO(-C_2H_4O)_n-H$$
$$RS(-C_2H_4O)_n-H$$

wherein the R's represent long chain alkyl radicals of 8 to 12 carbon atoms and $n$ is an integer from about 4 to 12. Other non-anionic detergents are the long-chain fatty acid esters of anhydrosorbitol, or the polyethylene glycol addition products of such esters. It is evident that the particular detergent used is not critical except that one should be chosen which is generally useful in emulsifying and detergent applications.

The amount of active detergent substituent of a cleaning formulation will also vary within wide limits and will depend upon such factors as specified above and in particular the purpose for which the formulation is intended. It has been found that from about 5 to about 95% of the total weight may advantageously be the detergent constituent with the preferred narrower commercial limits being from about 20 to about 35% by weight.

The cleaning formulation may also have added to it various other special additives such as hydrotopes or coupling agents, building agents and fillers including soda ash, sodium sesquicarbonate, sodium tetrapyrophosphate, sodium tripolyphosphate, sodium silicate, sodium metasilicate, borax and the like. In addition, non-alkaline inorganic salts such as sodium sulfate, sodium chloride and sodium bicarbonate may be added as well as scouring abrasives such as diatomaceous earth or ground pumice, bentonite and various other clays and clay-like substances. The amount of such special purpose additives or builders will naturally vary within wide limits or may even be omitted entirely. However, it has been found that amounts of from about 1% up to as high as 80% by weight based on the formulation weight may be added depending upon the purpose for which the formulation is intended.

The soil redeposition inhibitors of this invention may be incorporated into bar soaps for cleaning, laundering and scrubbing; scouring powders for more abrasive purposes; powdered or flaked soaps and synthetic organic non-soap detergents for laundry and general cleaning; for dry cleaning detergents and agents; and other synthetic detergents in liquid form.

In accordance with the present invention, it has been discovered that a detergent composition comprising in combination a water-soluble detergent such as a higher alkyl benzene sulfonate detergent and a mixture of a water-soluble polyvinyl alcohol soil-suspending agent and a water-soluble polyvinylpyrrolidone polymeric soil-suspending agent, the proportions thereof being effective in combination as more particularly described herein, exhibits an enhanced degree of soil suspension, particularly during washing of white fabrics. A synergistic improvement in soil suspension is achieved by this combination of soil-suspending agents with detergents as evidenced by a superior whiteness of the washed fabrics as compared to the expected effects for said mixtures. The expected value for any mixture can be calculated by averaging or summing the two independent effects resulting from the use of these agents individually. The reference to the water-soluble soil-suspending agents or similar expression is intended to refer to their solubility or dispersibility in aqueous detergent solutions and the property of these materials for inhibiting the deposition of soil from a detergent solution upon the fabric and is not limited to any specific mechanism for producing such effect.

The following examples are presented to illustrated the invention but it is not to be considered as limited thereto.

EXAMPLE

The synergistic mixture of this invention was tested for its anti-redeposition properties using aqueous detergent compositions of both the anionic and nonionic types in the proportions listed hereinafter.

(A) Anionic composition (1) 25% ultrawet 60-K-a linear $C_{12}$-alkyl-benzene sulfonate (laurylbenzene sulfonate), 60% active in aqueous slurry containing a minor amount of $Na_2SO_4$;
(2) 35% sodium tripolyphosphate
(3) 5% $Na_2SiO_3$
(4) 35% $Na_2SO_4$ (B) Nonionic composition (1) 20% Igepal CO-1630-Nonylphenol+9 ethylene oxide units;
(2) 35% sodium tripolyphosphate;
(3) 5% $Na_2SiO_3$
(4) 40% $Na_2SO_4$ The synergistic mixture was prepared in the proportions indicated below and evaluated for ability to increase whiteness with the anionic and nonionic detergent compositions described above in standard washing operations employing automatic washing machines. The synergistic soil anti-redeposition agent was present in an amount of 0.5 weight percent based on the detergent composition weight. These are set forth in the following table wherein PVP is polyvinylpyrrolidone and PVA is polyvinyl alcohol.

TABLE.—ANTI-REDEPOSITION EVALUATION OF MIXTURES OF PVP AND PVA
WHITENESS [1]

| Run No. | Product | Concentration, percent | Anionic formula | | | Nonionic formula | | |
|---|---|---|---|---|---|---|---|---|
| | | | Cotton | Spun Dacron | D/C[2] with finish | D/C[2] without finish | Cotton | Dacron | D/C[2] with finish | D/C[2] without finish |
| 1 | PVP<br>PVA | 0.25<br>0.25 | 55.9 | 56.3 | 56.4 | 65.4 | 56.0 | 49.6 | 58.8 | 66.6 |
| 2 | PVP<br>PVA | 0.375<br>0.125 | 58.5 | 55.6 | 55.9 | 65.7 | | | | |
| 3 | PVP<br>PVA | 0.125<br>0.375 | 57.3 | 53.2 | 58.0 | 64.2 | | | | |
| 4 | PVP<br>PVA | 0.375<br>0.125 | 56.4 | 51.9 | 56.0 | 64.9 | | | | |
| 5 | PVP<br>PVA | 0.25<br>0.25 | 56.0 | 55.7 | 55.4 | 65.3 | | | | |

[1] Whiteness = Green filter reflectance minus 4× green filter reflectance minus blue filter reflectance.
[2] D/C = Dacron/Cotton 65/35.

The invention has been described hereinabove with reference to certain preferred embodiments. However, it is not to be considered as limited thereto as obvious variations thereon will become apparent to those skilled in the art.

What is claimed is:

1. A composition for removing soil from a polyester textile material, and for minimizing the redeposition of the removed soil on said material, consisting essential of:
   (a) a water-soluble, anionic detergent composition containing about 25 parts by weight of a $C_8$–$C_{18}$ alkyl-benzene sulfonate, about 35 parts by weight of sodium tripolyphosphate, about 5 parts by weight $Na_2SiO_3$, and about 35 parts of $Na_2SO_4$;
   (b) a soil suspending mixture of water-soluble polyvinylpyrrolidone and a water-soluble polyvinyl alcohol product in the proportions of from about 3:1 to 1:3 by weight respectively, said polyvinylpyrrolidone having an average molecular weight of from about 15,000 to about 40,000, said polyvinyl alcohol product having a viscosity, measured in a 4% aqueous solution at 20° C., in the range of from about 1.8 to about 65 centipoises and a polyvinyl acetate content of from about 10% to about 30% by weight based on the total weight of said polyvinyl alcohol product, said mixture being employed in an amount within the range of from about 2% to about 10% by weight based on the weight of said alkyl-benzene sulfonate, whereby said composition in aqueous solution effectively removes soil from the polyester textile material being washed through the action of the detergent composition, the synergistic polyvinylpyrrolidone and polyvinyl alcohol mixture being effective as a soil-suspending agent in the aqueous solution so as to inhibit the redeposition of soil back onto the material being washed, thereby enhancing the whiteness and cleanliness of the washed material.

2. The composition of claim 1 in which said polyvinylpyrrolidone and said polyvinyl alcohol are present in a proportion of about 1:1 by weight.

3. The composition of claim 1 in which the polyvinylpyrrolidone/polyvinyl alcohol ratio is about 3:1, respectively, by weight.

4. The composition of claim 1 in which the polyvinylpyrrolidone/polyvinyl alcohol ratio is about 1:3, respectively, by weight.

5. The composition of claim 1 in which said polyvinyl alcohol has a viscosity of from about 1.8 to about 6 centipoises.

6. A composition for removing soil from a polyester textile material, and for minimizing the redeposition of the removed soil on said material, consisting essentially of:
   (a) a water-soluble, nonionic detergent composition containing about 20 parts by weight of a surface-active nonyl-phenol-ethylene oxide condensate, about 35 parts by weight of sodium tripolyphosphate, about 5 parts by weight of $Na_2SiO_3$ and about 40 parts by weight of $Na_2SO_4$; and
   (b) a soil suspending mixture of about equal proportions by weight of water-soluble polyvinylpyrrolidone and a water-soluble polyvinyl alcohol product, said polyvinylpyrrolidone having an average molecular weight of from about 15,000 to about 40,000, said polyvinyl alcohol product having a viscosity, measured in a 4% aqueous solution at 20° C., in the range of from about 1.8 to about 65 centipoises and a polyvinyl acetate content of from about 10% to about 30% by weight based on the total weight of said polyvinyl alcohol product, said mixture being employed in an amount within the range of from about 2% to about 10% by weight based on the weight of said nonylphenol, whereby said composition in aqueous solution effectively removes soil from the polyester textile material being washed through the action of the detergent composition, the synergistic polyvinylpyrrolidone and polyvinyl alcohol mixture being effective as a soil-suspending agent so as to inhibit the redeposition of soil back onto the material being washed, thereby enhancing the whiteness and cleanliness of the washed material.

7. The composition of claim 6 in which said polyvinyl alcohol has a viscosity of from about 1.8 to about 6 centipoises.

References Cited

UNITED STATES PATENTS

| | | | |
|---|---|---|---|
| 3,318,816 | 5/1967 | Trowbridge | 252—137 |
| 3,254,028 | 5/1966 | Wixon | 252—137 |
| 3,248,331 | 4/1966 | Inamorato | 252—138 |
| 3,144,412 | 8/1964 | Inamorato | 252—138 |
| 3,000,830 | 9/1961 | Fong et al. | 252—117 |
| 2,798,047 | 7/1957 | Tovey et al. | 252—152 |
| 2,755,252 | 7/1956 | Fong et al. | 252—161 |
| 2,897,120 | 7/1959 | Cronin et al. | 424—80 X |
| 2,861,920 | 11/1958 | Dale et al. | 424—80 X |

OTHER REFERENCES

"Prevention of Soil Redeposition" by W. Fong and H. P. Lundgren, Textile Research Journal, November 1953, pp. 769–775.

"Intrinsic Viscosity of Solution" by G. Langhammer et al., Naturwissenschaften, 43, 1956, pp. 125 and 126.

LEON D. ROSDOL, Primary Examier

D. L. ALBRECHT, Assistant Examiner

U.S. Cl. X.R.

252—89, 110, 132, 539, 542, DIG. 15